United States Patent
Asai

(10) Patent No.: US 7,769,152 B2
(45) Date of Patent: Aug. 3, 2010

(54) COMMUNICATIONS APPARATUS AND COMMUNICATIONS SYSTEM INCLUDING THE COMMUNICATIONS APPARATUS

(75) Inventor: Kazunobu Asai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1086 days.

(21) Appl. No.: 11/451,474

(22) Filed: Jun. 13, 2006

(65) Prior Publication Data

US 2007/0041539 A1    Feb. 22, 2007

(30) Foreign Application Priority Data

Jun. 14, 2005   (JP)  .............................. 2005-173490

(51) Int. Cl.
 H04M 1/56     (2006.01)
 H04M 15/00    (2006.01)
(52) U.S. Cl. .............................. 379/142.13; 379/93.05; 379/142.01; 379/377
(58) Field of Classification Search .............. 379/92.04, 379/93.01, 93.05, 93.09, 93.11, 93.15, 93.23, 379/100.06, 100.16, 142.01, 142.13, 142.14, 379/142.15, 372, 373.01, 377, 387.01, 399.01
See application file for complete search history.

(56) References Cited

U.S. PATENT DOCUMENTS

| 5,062,133 | A | * | 10/1991 | Melrose | ................... 379/93.11 |
|---|---|---|---|---|---|
| 5,867,567 | A | * | 2/1999 | Itoh | ....................... 379/142.04 |
| 5,901,210 | A | * | 5/1999 | Schley-May | ........... 379/142.01 |
| 6,240,165 | B1 | * | 5/2001 | Yano et al. | ................ 379/88.21 |
| 6,393,123 | B1 | * | 5/2002 | Staver et al. | ................. 379/377 |
| 6,819,710 | B1 | * | 11/2004 | Dupuis | ....................... 375/222 |
| 7,634,070 | B2 | * | 12/2009 | Olafsson et al. | .......... 379/93.35 |
| 2004/0100854 | A1 | * | 5/2004 | Rahamim et al. | ........... 365/232 |

FOREIGN PATENT DOCUMENTS

| EP | 0573721 A1 | 12/1993 |
|---|---|---|
| JP | 6-62140 | 3/1994 |
| JP | 9-270870 | 10/1997 |

* cited by examiner

Primary Examiner—Binh K Tieu
(74) Attorney, Agent, or Firm—Banner & Witcoff, Ltd.

(57) ABSTRACT

A multifunction device previously stores a line connection condition of when a line interface received caller ID information in an EEPROM, and determines that a line with an exchange is connected based on a first ringing signal or a second ringing signal. When it is determined based on the first ringing signal that a line connection is a first type of connection, the line is connected according to the line connection condition. On the other hand, when it is determined based on the second ring signal that a line connection is a second type of connection, the line is connected using a line connection condition, which is adjusted by an adjustment device at the time of determination.

9 Claims, 8 Drawing Sheets

COMMUNICATIONS APPARATUS AND COMMUNICATIONS SYSTEM INCLUDING THE COMMUNICATIONS APPARATUS

CROSS REFERENCE TO RELATED APPLICATION

This application claims priority from Japanese Patent Application No. 2005-173490, filed on Jun. 14, 2005, the entire subject matter of which is incorporated herein by reference.

TECHNICAL FIELD

Aspects of the invention relate to telephones, facsimile machines, and other communications apparatuses that are capable of receiving caller ID information specifying a caller, e.g. a telephone number, which is transmitted from an exchange through a telephone line or other communication network, and relates to a communications system including those communications apparatuses.

BACKGROUND

Various kinds of communications apparatuses have been proposed that include a function to receive data of caller ID information to be transmitted from a caller when there is a call from the caller and then to display the received data on a display (for instance, liquid crystal display) provided on the communications apparatuses. This function is also referred to as a caller ID information notification service.

For example, in a proposed facsimile machine, when a 16-Hz ringing signal is transmitted from an exchange in response to a call from a caller, the on-time and the off-time of the ringing signal are respectively measured by timers to detect a dial pattern of the ringing signal. When the detected dial pattern of the ringing signal is for a first ringing signal that is a 16-Hz signal, a corresponding incoming call procedure is executed. When the detected dial pattern of the ringing signal is for a second ringing signal that is a normal ringing signal, a normal incoming call procedure is executed.

In addition, other proposed systems include a communications apparatus having a communications systems including a data access arrangement (DAA) that is connected to a telephone line to receive a ringing signal and that controls a line connection in response to the reception of the ringing signal.

SUMMARY

Aspects of the invention provide a communications apparatus having a data access arrangement (DAA) and a communications system including the communications apparatus that can connect a line between an exchange and the communications apparatus in a communicable state.

According to an aspect of the invention, when a signal detection device detects line connection based on a first ringing signal, there is no need to cause an adjustment device to adjust a line connection condition (a telephone line voltage value and a telephone live current). Thus, the telephone line can be quickly connected as a whole. Specifically, when the line between the communications apparatus and the exchange is connected conditionally on a specified telephone line voltage without consideration of impedance of the whole telephone line, a large current can be prevented from flowing inside the communications apparatus. In addition, the communications apparatus and the exchange can be connected in a communicable state for a short period without any adjustment.

In some aspects of the invention, the communications apparatus may or may not use or set the caller ID service. When the communications apparatus is used, the communications device controls line connection in the same way as when the signal determination device detects the line connection based on the second ringing signal.

According to another aspect of the invention, the communications apparatus can receive a call incoming from the answering device according to a setting by a user of the communications apparatus, without a call from a third party.

BRIEF DESCRIPTION OF THE DRAWINGS

Illustrative embodiments of the invention will be described in detail with reference to the following figures wherein.

DETAILED DESCRIPTION

The following description describes a communications apparatus according to illustrative embodiments of the invention with reference to drawings. It is to be understood that the invention is not restricted to the particular forms shown and described below but may include additional or alternative forms from those described herein without departing from the scope of the aspects of the invention. In particular, various modifications and alterations can be made thereto without departing from the scope of the invention.

It is noted that various connections are set forth between elements in the following description. It is noted that these connections in general and, unless specified otherwise, may be direct or indirect and that this specification is not intended to be limiting in this respect.

First Embodiment

Figure 1:
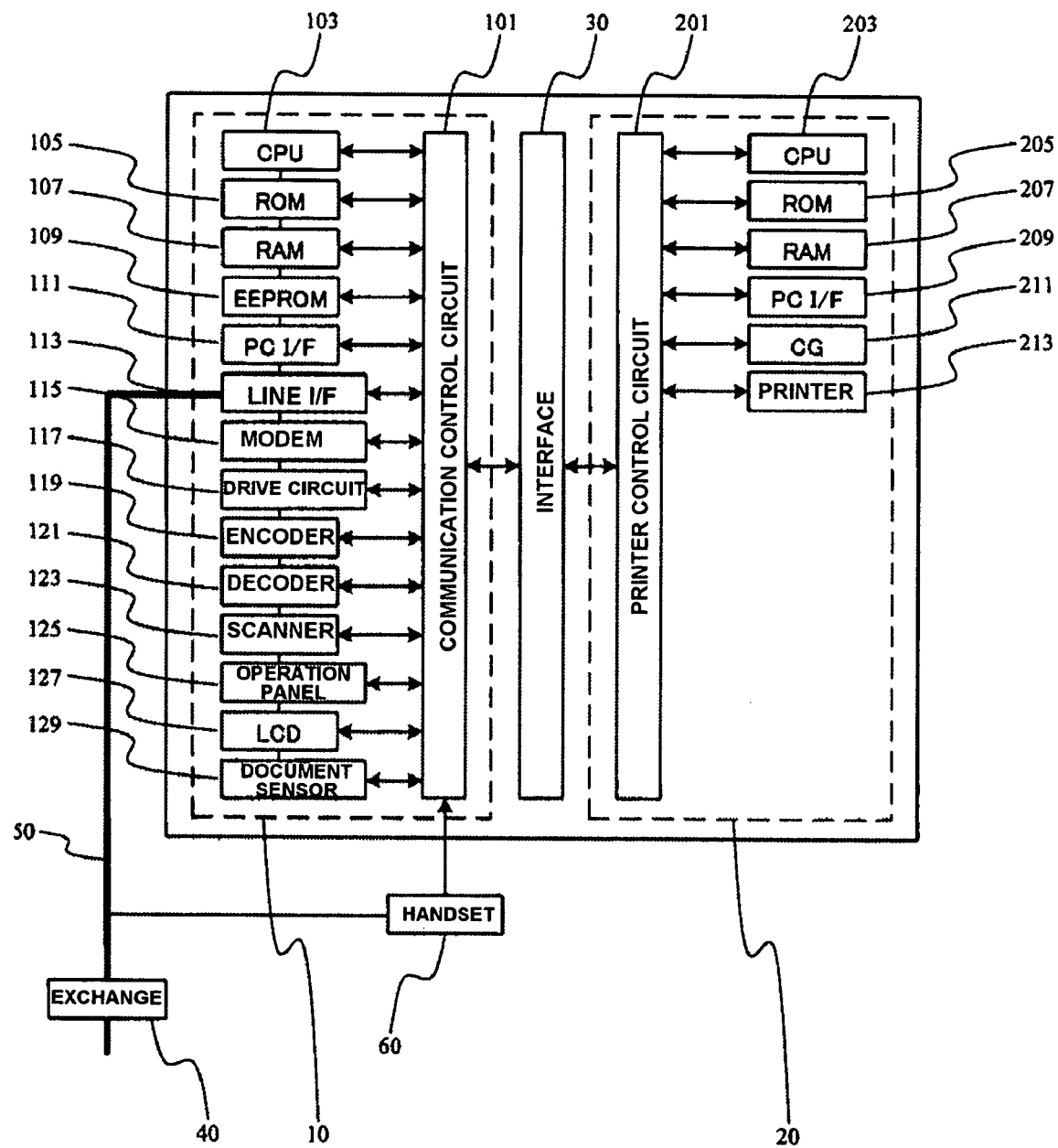
FIG. 1 is a block diagram of a multifunction device according to illustrative embodiments of the invention.

FIG. 1 shows a configuration of a multifunction device as a communication apparatus. The multifunction device 1 includes a facsimile function, a telephone function, a printer function, and a scanner function. The multifunction device 1 may be connected to a personal computer (hereinafter referred to as PC) via a PC interface 111. In the multifunction device 1, a communications unit 10 and a printer unit 20 are connected via an interface 30.

Figure 2:
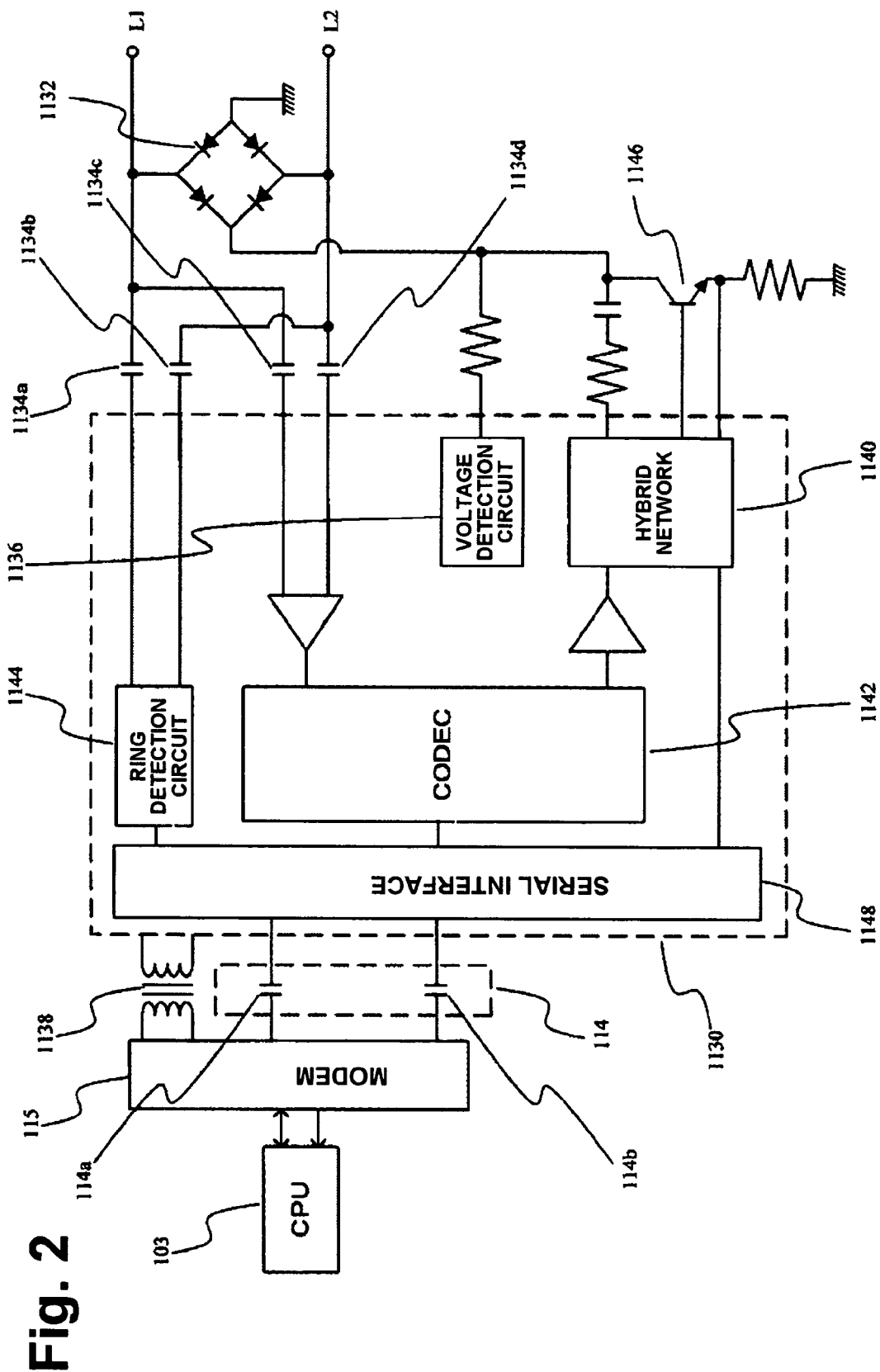
FIG. 2 is a block diagram of a line interface according to illustrative embodiments of the invention.

The communications unit 10 is provided with a communication control circuit 101, and the communication control circuit 101 is connected to the following elements as shown in FIGS. 1 and 2.

A CPU 103 controls the communications unit 10 in accordance with one or more control programs (for executing various processes including the following process) stored in the ROM 105 or stored in another memory.

An EEPROM 119 is a non-volatile memory, and functions as a storage device as the so-called telephone directory by storing a caller name and caller ID information in association with each other. The EEPROM 109 also stores a first line connection condition of when a line interface 113 is connected to an exchange 40 via a telephone line 50 in a communicable state (or when the line interface 113 is capable of receiving caller ID information). The first line connection condition is used to connect the line when the line interface 113 receives a first ringing signal, which is to be transmitted from the exchange 40 prior to caller ID information. For example, the first ringing signal may have a period of high level for 0.5 seconds, a period of low level for 0.5 seconds, and a frequency of 16 hertz when the signal is transmitted from the exchange 40 during the period of high level (6 pulses).

The exchange 40 may generate the first and second signals. It is appreciated that the first and second signals may originate from other systems connected to the telephone exchange 40. These other systems may include residential gateways, cable modems, and other computing systems (using other transmission techniques including but not limited to VOIP) that receive data from one or more telephone exchanges and convert the data to the first and second signals.

It is appreciated that various storage devices may be used in conjunction with aspects of the present invention. In particular, various RAM, ROM, EEPROM, other static storage devices, dynamic storage devices (including but not limited to hard drives) may be used as one or more storage devices in aspects of the present invention.

The line interface 113 may include a data access arrangement (DAA) 1130 as shown in FIG. 2, and may be connected to an exchange 40 via a telephone line 50. The line interface 113 receives caller ID information, the first ringing signal (which is to be transmitted prior to the caller ID information), and a second ringing signal (which is to be transmitted after the caller ID information is transmitted). For example, the second ringing signal can have a period of high level for one second, a period of low level for two seconds, and a frequency of 16 hertz when the signal is transmitted from the exchange 40 during the period of high level. The line interface 113 also may control line connection during reception of the first and second ringing signals.

The caller ID information may include a telephone number of a caller, a name of the caller, or both of the telephone number and the name of the caller.

A modem 115 compresses data, which is transmitted and received between the multifunction device 1 and the communication party (not shown), using an encoder 119. The data may include, for example, image data, which is scanned by a scanner 123 and temporality stored in a RAM 107. The modem 115 modulates the compressed data and demodulates image data transmitted from the communication party. Data demodulated by the modem 115 is decompressed by a decoder 121 and made available.

In addition, an operation panel 125 where a user of the multifunction device 1 performs operations, a liquid crystal display (LCD) 127 for providing information to the user, and other elements are included in the communications unit 10. Details in accordance with one example of the present invention are shown in FIG. 1.

Aspects of the invention may include optional components as may be provided based on desired features. The optional components may include RAM 207, PC interface 209, character generator 211, printer 213, and other components.

FIG. 2 is a block diagram showing the line interface 113. The DAA 1130 included in the line interface 113 may include functions to detect and receive the first and second ringing signals.

The DAA 1130 and the modem 115 are connected via an isolator 114. The isolator 114 provides galvanic isolation between the DAA 1130 and the modem 115 while the isolator 114 allows data and signals to pass through.

The line interface 113 is provided with a rectifier 1132 and DC loop cut capacitors 1134a, 1134b, 1134c, and 1134d. L1 and L2 are terminals to which the phone line 50 is connected.

The rectifier 1132 is configured to rectify the polarity of the DC loop current of the telephone line 50 in one direction. The power of the DAA 1130 is supplied from the modem 115 via a transformer 1138, rectified by the rectifier 1132, and becomes voltage of a specified polarity regardless of the voltage polarity of the telephone line 50.

A voltage detection circuit 1136 is configured to measure voltage, which has been rectified by the rectifier 1132 and then supplied to the DAA 1130. A result by the voltage detection circuit 1136 is output from the DAA 1130 to the CPU 103 via the modem 115.

A hybrid network 1140 is configured to connect and disconnect the line, and includes a two to four wire conversion circuit, a canceller circuit, and a filter circuit. The two to four wire conversion circuit divides facsimile data from the telephone line 50 into send data and receive data. The canceller circuit prevents the send data from entering a receive path.

A codec 1142 executes an analog to digital (A/D) conversion and a digital to analog (D/A) conversion of facsimile receive data and facsimile send data. When the codec 1142 detects a tone signal from the telephone line 50, the codec 1142 sends a tone detection signal to the CPU 103 and the CPU 103 detects the tone detection signal.

When the first or second ringing signal reaches a ring detection circuit 1144 from the telephone line 50, a ring detection signal is transmitted from the ring detection circuit 1144 to the CPU 103 via a serial interface 1148, a capacitor 114a of the isolator 114, and the modem 115, and is detected by the CPU 103. The ring detection signal is a signal whose cycle is the same as the cycles of the first and second ringing signals and whose waveform changes from low to high level or from high to low level.

A transistor 1146 is configured to adjust impedance of the DAA 1130 by changing a base potential of the transistor 1146 so that a telephone line voltage to be measured when the line is connected by a voltage measurement circuit 1136 has predetermined voltage current characteristics.

A line current is calculated by the CPU 103 based on the telephone line voltage detected by the voltage detection circuit 1136 and the impedance of the DAA 1130.

The serial interface 1148 is configured to integrate various signals, such as a ring detection signal transmitted from the ring detection circuit 1144 and facsimile receive data from the codec 1142, into serial data for a capacitor 114b of the isolator 114. In addition, the serial interface 1148 is configured to separate serial signals transmitted from the capacitor 114a of the isolator 114 into control signals and facsimile send data. The control signals are used for causing the DAA 1130 to connect or disconnect the telephone line 50 between the exchange 50 and the multifunction device 1. The facsimile send data may then be transmitted to the codec 40.

The printer unit 20 is provided with a printer control circuit 201, which is connected to a CPU 203 that controls each operation of the printer unit 20, with a possible structure as shown in FIG. 1.

Figure 3:
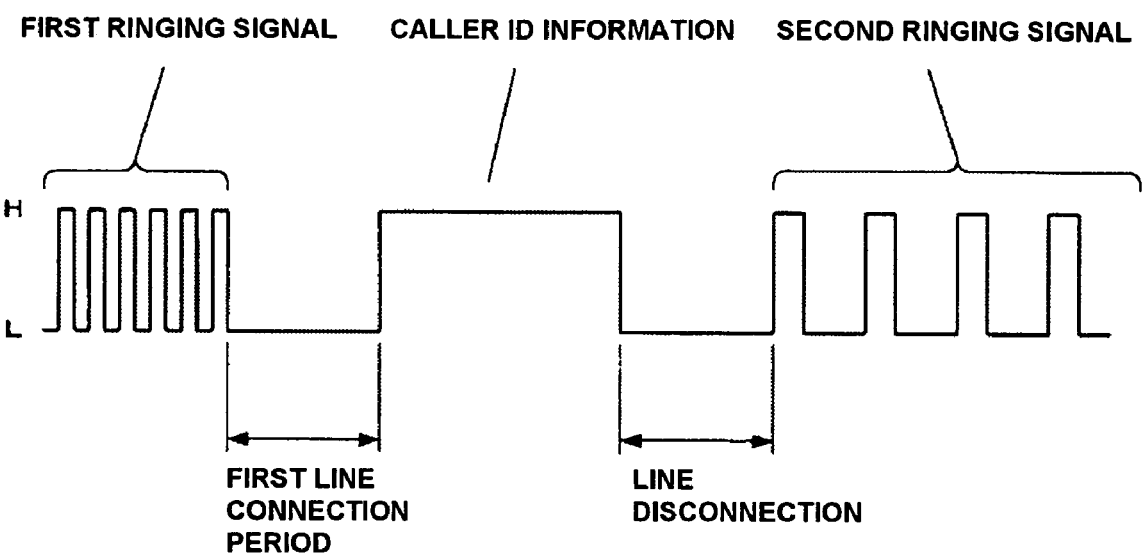
FIG. 3 illustrates signals transmitted from an exchange to the multifunction device according to illustrative embodiments of the invention.

FIG. 3 shows signals transmitted from the exchange 40 to the multifunction device 1. First, a polarity reversal signal (not shown) is transmitted from the exchange 40, and then a first ringing signal is transmitted. When the line interface 113 receives the first ringing signal, it performs line connection to connect the line between the line interface 113 and the exchange 40 in order to receive caller ID information to be transmitted next.

In this embodiment, the "line connection" is a series of actions that are performed in order to connect the multifunction device 1 and the exchange 40 in a communicable state. "Line connection operation" refers to just an operation performed by the multifunction device 1 to connect the multifunction device 1 and the exchange 40 in a communicable state. It does not matter whether the multifunction device 1 and the exchange 40 have been in communication with each other.

By setting a telephone line voltage and a telephone line current in appropriate ranges after the line connection operation, the line connection based on the first ringing signal is ended. The line connection is performed during a first line connection period shown in FIG. 3.

The line interface 113 receives the caller ID information, and the caller ID information is stored in the RAM 107. Then, the line interface 113 temporarily disconnects the connection with the exchange 40. The connection is disconnected during a period of line disconnection shown in FIG. 3.

For fax communications, the line interface 113 can automatically perform the line connection operation again based on the reception of the second ringing signal, so that the line connection with the exchange 40 is performed. For telephone communications, the CPU 103 causes a speaker (not shown), included in the multifunction device 1, to provide a ringing sound based on the reception of the second ringing signal in order to notify the user of the multifunction device 1 that there is an incoming call. When the user picks up the handset 60 in response to the ringing sound, the line interface 113 executes the line connection operation again, so that the line connection with the exchange 40 is performed.

After the line connection by the line interface 113 based on the second ringing signal, a special signal such as for representing caller ID information is not transmitted. After the line connection based on the second ringing signal, a conversation with the party on the other end of the line is started or facsimile data is transmitted. Thus, the line connection operation responsive to the reception of the second ringing signal should be correctly performed so as to make it possible to have a conversion with the party on the other end of the line or to receive the facsimile data.

In contrast, for the line connection by the line interface 113 based on the first ringing signal, it is desirable to reliably receive the caller ID information, which is transmitted after the line connection based on the first ringing signal at a timing determined by the exchange 40 only one time. In other words, if this receiving results in failure, it becomes difficult or impossible to display the caller ID information on the LCD display 127 prior to the line connection based on the second ringing signal.

The line connection performed by the line interface 113 including the DAA 1130 will be described with reference to FIG. 4.

The CPU 103 determines whether a ringing signal received by the line interface 113 is a first ringing signal at S10. When it is not a first ringing signal (S10: No), namely, when it is a second ringing signal, the line interface 113 performs the line connection operation and measures the telephone line voltage at the line connection (S30).

The CPU 103 determines whether the telephone line voltage measured at S30 and a calculated telephone line current fall within a specified range (S40). When the CPU 103 determines that they fall within the specified range (S40: Yes), it assumes that adjustment is completed, and finishes the line connection, and communications with the party on the other end of the line are started.

When the CPU 103 determines that the telephone line voltage and the telephone line current do not fall within the specified range (S40: No), the process moves to S50 because the adjustment is not finished yet.

To prevent a large current from flowing inside the multifunction device 1, the line connection based on the second ringing signal is performed by increasing the impedance of the DAA 1130 set by the transistor 1146. Thus, after that, to lower the impedance of the DAA 1130, the base potential (parameter) of the transistor 1146 is adjusted in stages so that the telephone line voltage and the telephone line current may fall within the specified range (S50). This step is repeated until the CPU 103 determines that the telephone line voltage and the telephone line current fall within the specified range (S40: Yes). Alternatively, one may use a look up table to adjust a line current and line voltage to quickly fall within a desired range. Further, alternative approaches may be used to adjust the line voltage and line current as known in the art without departing from the scope of the invention.

At S10, when the CPU 103 determines that the ringing signal is the first ringing signal (S10: Yes), the above adjustment is not performed, and the line connection operation is performed using the base potential of the transistor 1146, which is obtained when the multifunction device 1 is connected via the telephone line 50 to the exchange 40 in a communicable sate, and which is stored in the EEPROM 109 (S20). Then, the line connection is finished.

In a initial state of the multifunction device 1, e.g. at a start of use, the base potential of the transistor 1146 to be stored in the EEPROM 109 may be set in advance using various methods.

For example, the base potential of the transistor 1146 may be set by executing steps S30 through 50 after it is determined as "No" in S10 when the user lifts the handset 60 in a calling operation after the telephone line 50 is connected to terminals L1 and L2 (FIG. 2).

Also, when a call is made, the multifunction device 1 may be connected with the exchange 40 in a communicable state. In a transition to such a state, the communications unit 10 is controlled to adjust the base potential of the transistor 1146. Thus, the base potential of the transistor 1146, which is adjusted via the calling operation, may be stored in the EEPROM 109. The calling operation can be executed by the CPU 103 based on a program stored in the ROM 105. In this case, when a dial tone transmitted from the exchange 40 is detected, it is assumed that the telephone line is connected as a whole. Thus, it can be assumed that the adjustment of the base potential of the transistor 1146 is completed.

In addition, when an incoming call first arrives with the telephone line 50 is connected to the terminals L1, L2 (see FIG. 2), regardless of determination at S10, steps S30 through S50 may be executed to adjust the base potential of the transistor 1146, and the adjusted base potential may be stored in the EEPROM 109.

Figure 4:
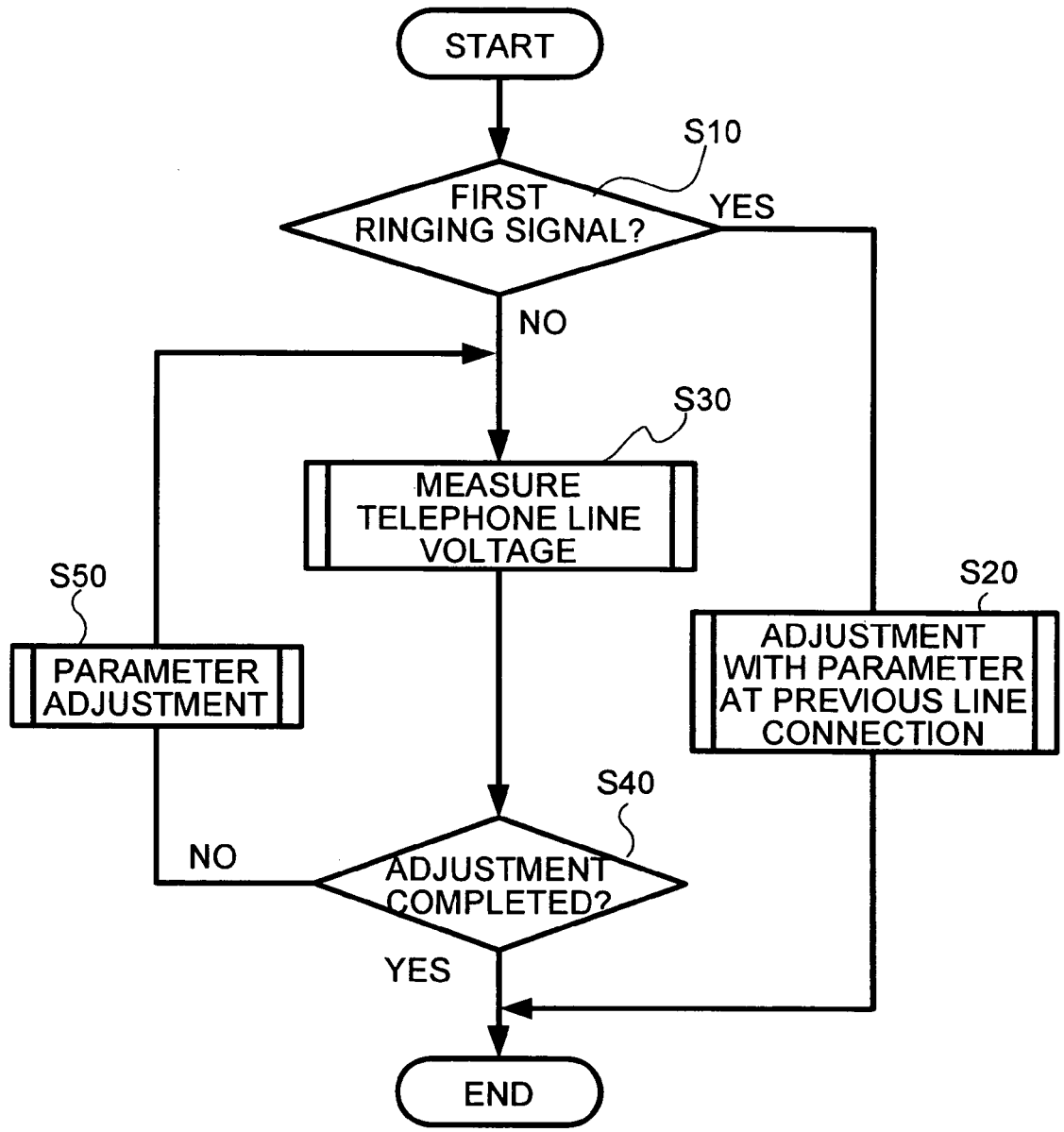
FIG. 4 is a flowchart for line connection according to illustrative embodiments of the invention.

In an initial state, the base potential adjusted by the above methods corresponds to a "parameter at the previous line connection" in S20 of FIG. 4, and becomes a first line connection condition of when the multifunction device 1 is connected to the exchange 40 via the telephone line in a communicable state. From then on, when it is determined as a first ringing signal at S10, the line connection may be performed according to the adjusted base potential.

Connection of the telephone line 50 to the terminals L1 and L2 (FIG. 2) may be detected by measuring resistance between the terminals L1 and L2. Alternative approaches may include measuring voltage, current, or other parameters to determine whether telephone line 50 has been connected to the terminals.

Figure 5:
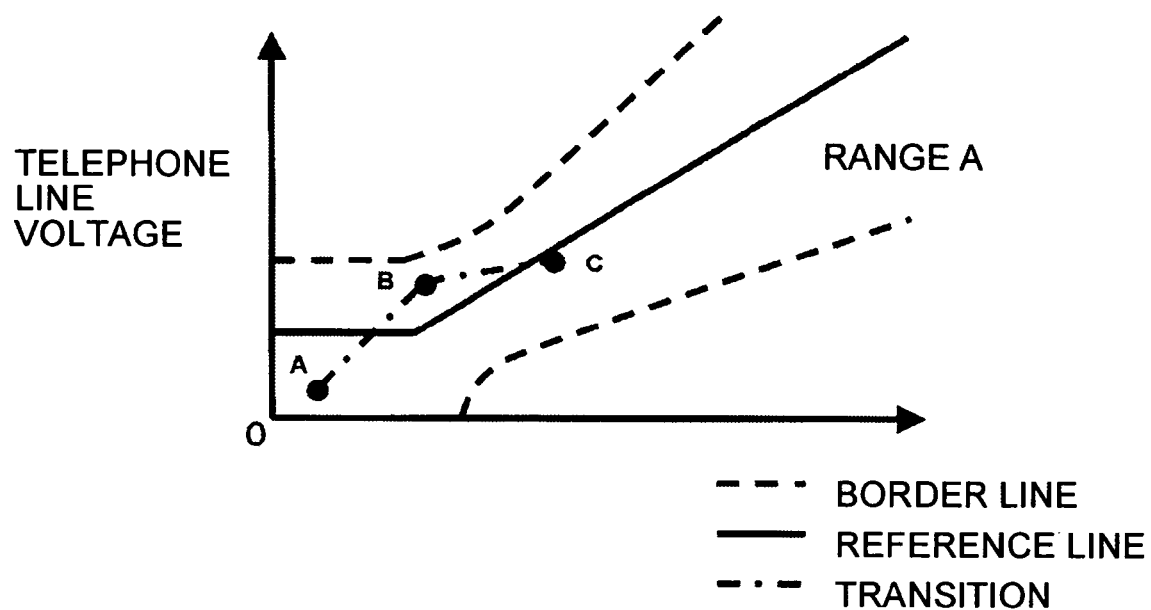
FIG. 5 illustrates a relationship between a telephone line current and a telephone line voltage according to illustrative embodiments of the invention.

The parameter adjustment in S50 of FIG. 4 will be described with reference to FIGS. 4 and 5. FIG. 5 shows a conception showing a relationship between the telephone line current and the telephone line voltage, the horizontal axis indicates line current, and the vertical axis indicates line voltage. In both axes, values may increase in the directions of the arrows.

Broken lines in the figure indicate border lines for the telephone line current value and the telephone line voltage value, which are preset for the line connection by the DAA 1130. The telephone line current value and the telephone line voltage value should be set so that they fall within a range A (an appropriate range) defined between the broken lines (as known from the DAA specification). In contrast, a solid line indicates a relationship between the telephone line voltage value and the telephone line current value in the appropriate range.

In the multifunction device 1 in the embodiment, the base potential of the transistor 1146 is adjusted in stages so as to obtain the telephone line current value and the telephone line voltage value whose plotted point is placed on or close to the solid line. The solid line, which is used as the reference, is determined based on plural points (e.g. five points) in the range A.

Point A is plotted based on the telephone line voltage value and the telephone line current value when the line connection action is performed based on that it is determined as a second ringing signal at S10 (S10: No). The point A is away from the reference line because it is out of a range predetermined with respect to the reference line. Thus, it is determined as "No" in S40, and the base potential of the transistor 1146 is changed for one stage (for a predetermined amount) in S50.

Point B indicates a relationship between the telephone line voltage value and the telephone line current value when the base potential is changed for one stage. Comparing with the point A, the point B is approximate to the reference line but it is determined that the point B is still out of the range predetermined with respect to the reference line (S40: No). Thus, the base potential of the transistor 1146 is changed for one more stage in S50. A point C indicates a relationship between the telephone line voltage value and the telephone line current value when the base potential is changed for one more stage. The point C is determined that it is within the range predetermined with respect to the reference line (S40: Yes), and the line connection is ended.

In contrast, when it is determined as a first ringing signal at S10 (S10: Yes), the above steps are not executed, and the base potential, which satisfies the point C and is previously stored in the EEPROM 109, is initially used for the line connection.

The setting of the base potential based on the first ringing signal is determined according to a judgment that it presents no problem because, as long as the installation site of the multifunction device 1 is unchanged, there is no change in resistance of the telephone line between the multifunction device 1 and the exchange 40. Thus, in the above description, when it is determined as a second ringing signal at S10, adjustment is made in stages from a base potential that produces little adverse effect on the multifunction device 1 such as a base potential that satisfies the point A. However, the base potential previously stored in the EEPROM 109 may be set as the initial base potential for adjustment. According to this setting, the line connection based on the second ringing signal can be made more reliably and rapidly.

Second Embodiment

In a second embodiment, the following description will be made as to a communications system that is capable of automatically checking whether the line interface 113, which is used for performing the line connection upon the reception of the first ringing signal, can receive the caller ID information in response to a first line connection condition, which is previously stored in the EEPROM 109 and used in connection with the exchange 40 in a communicable state via the telephone line 50. In addition, the following description will be made provided that the multifunction device 1 is subscribed to a telephone number notification service as caller ID information notification service.

Figure 6:
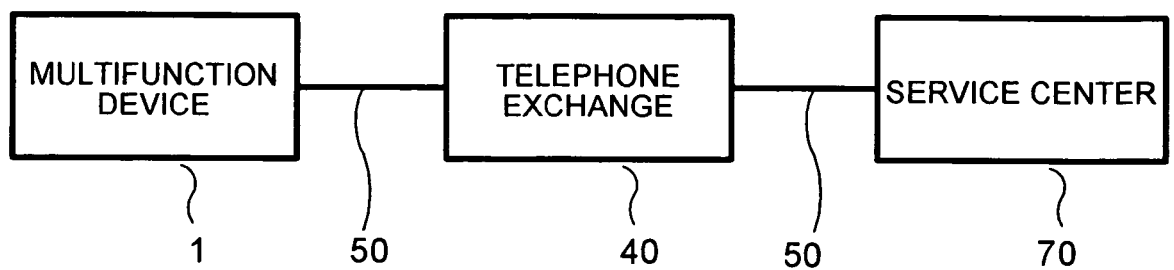
FIG. 6 shows a communications system according to illustrative embodiments of the invention.

FIG. 6 shows an overview of the communications system according to the embodiment. In the communications system, the multifunction device 1 and a service center 70 are connected via the exchange 40 by the telephone line 50.

Although the multifunction device 1 according to the second embodiment has the same basic configuration as that described in the first embodiment, it further includes the following configuration. The EEPROM 109 stores a telephone number (e.g. 052-824-xxxx) of the service center 70 as well as the first line connection condition, in advance (e.g. at a manufacturing stage of the multifunction device 1).

The ROM 105 stores a program in which a call is placed to the telephone number of the service center 70 when the call is instructed via the operation panel 125, and checking is made as to whether the multifunction device 1 can receive the telephone number of the service center 70 based on the first line connection condition stored in the EEPROM 109. The call may be automatically issued when a connection of the telephone line 50 to the terminals L1 and L2 (FIG. 2) is detected.

Figure 7:
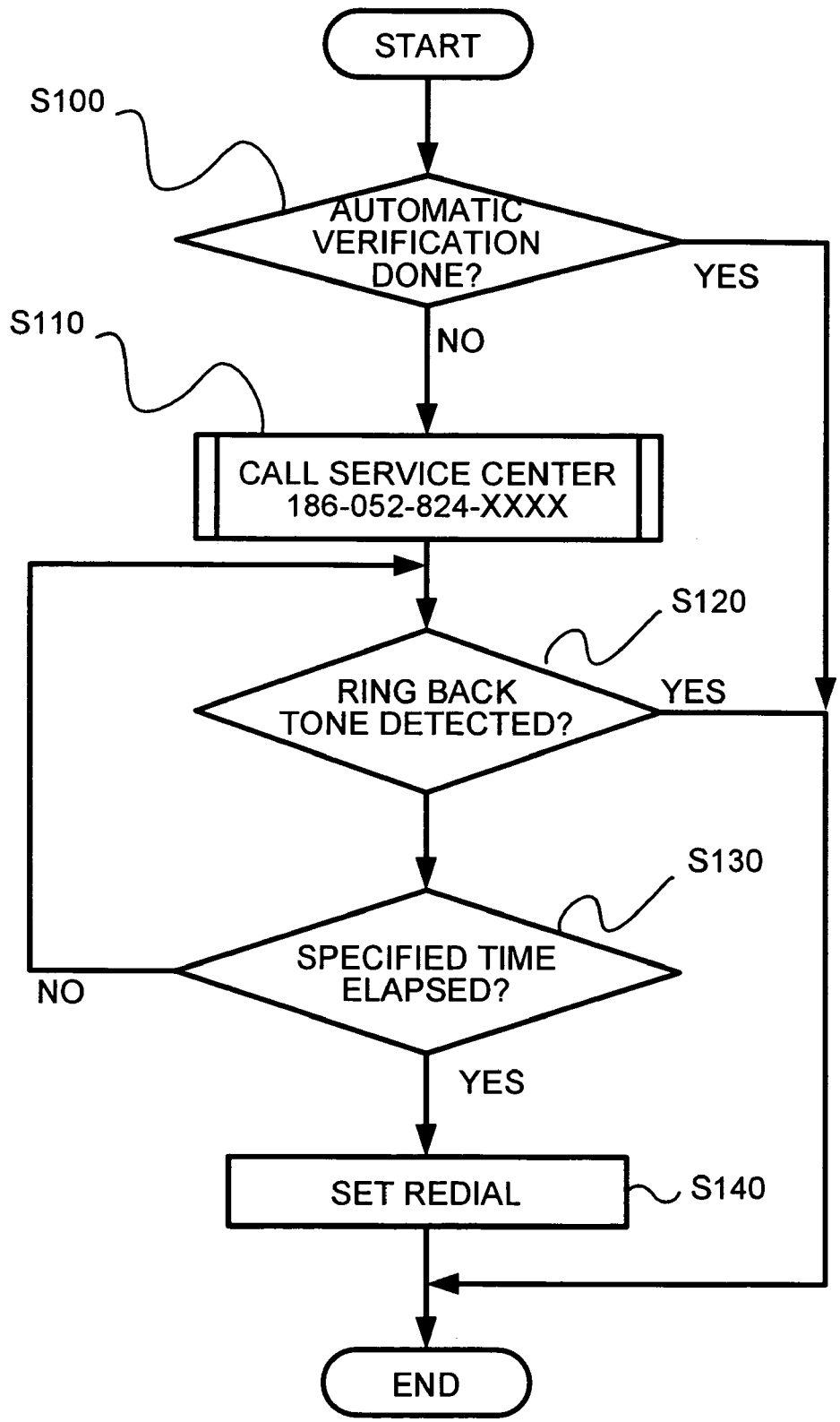
FIG. 7 is a flowchart of a calling operation in an automatic verification process according to illustrative embodiments of the invention.

FIG. 7 is a flowchart illustrating one of procedure relating to automatic verification that verifies the first line connection condition stored in the EEPROM 109. Specifically, FIG. 7 shows a calling operation between the multifunction device 1 and the service center 70 to transmit the telephone number of the multifunction device 1 to the service center 70. The calling operation is executed for a call to be issued from the service center 70 to the multifunction device 1.

When the automatic verification is instructed by the user via the operation panel 125, the CPU 105 of the multifunction device 1 determines whether the automatic verification has been already executed (S100). When the automatic verification is already executed (S100: Yes), it is finished.

When the automatic verification is not executed yet (S100: No), the multifunction device 1 issues a call to the service center 70 in accordance with the telephone number of the service center 70 previously stored in the EEPROM 109 (S110). The call to the service center 70 is issued for the purpose of transmitting the telephone number of the multifunction device 1 to the service center 70 so that a call can be made from the service center 70 to the multifunction device 1. Thus, regardless of whether the multifunction device 1 is subscribed to the caller ID information notification service, the multifunction device 1 is preferably configured to transmit the telephone number of the multifunction device 1 forcefully to the service center 70 when a call is issued to the service center 70, for example, by dialing a specified number prior to dialing the telephone number of the service center 70.

The multifunction device 1 issues a call to the service center at S110, and determines whether the ring detection circuit 1144 detects a ring back tone in response to the call at S110 (S120). When the ring back tone is detected (S120: Yes), the multifunction device 1 assumes that the telephone number of the multifunction device 1 was appropriately transmitted to the service center 70, and then finishes the automatic verification. If the ring back tone is not detected (S120: No), the multifunction device 1 determines whether a specified time has elapsed since the call to the service center 70 is started. If the specified time has not elapsed (S130: No), the flow returns to S120 to determine whether the ring back tone is detected. If the specified time has elapsed, the multifunction device 1 determines that it is impossible to issue the call to the service center 70, sets a redial at S140 so as to enable the call to be issued later, and then finishes the automatic verification. If the redial is set at S140, the calling operation will be made after the specified time has elapsed.

Figure 8:
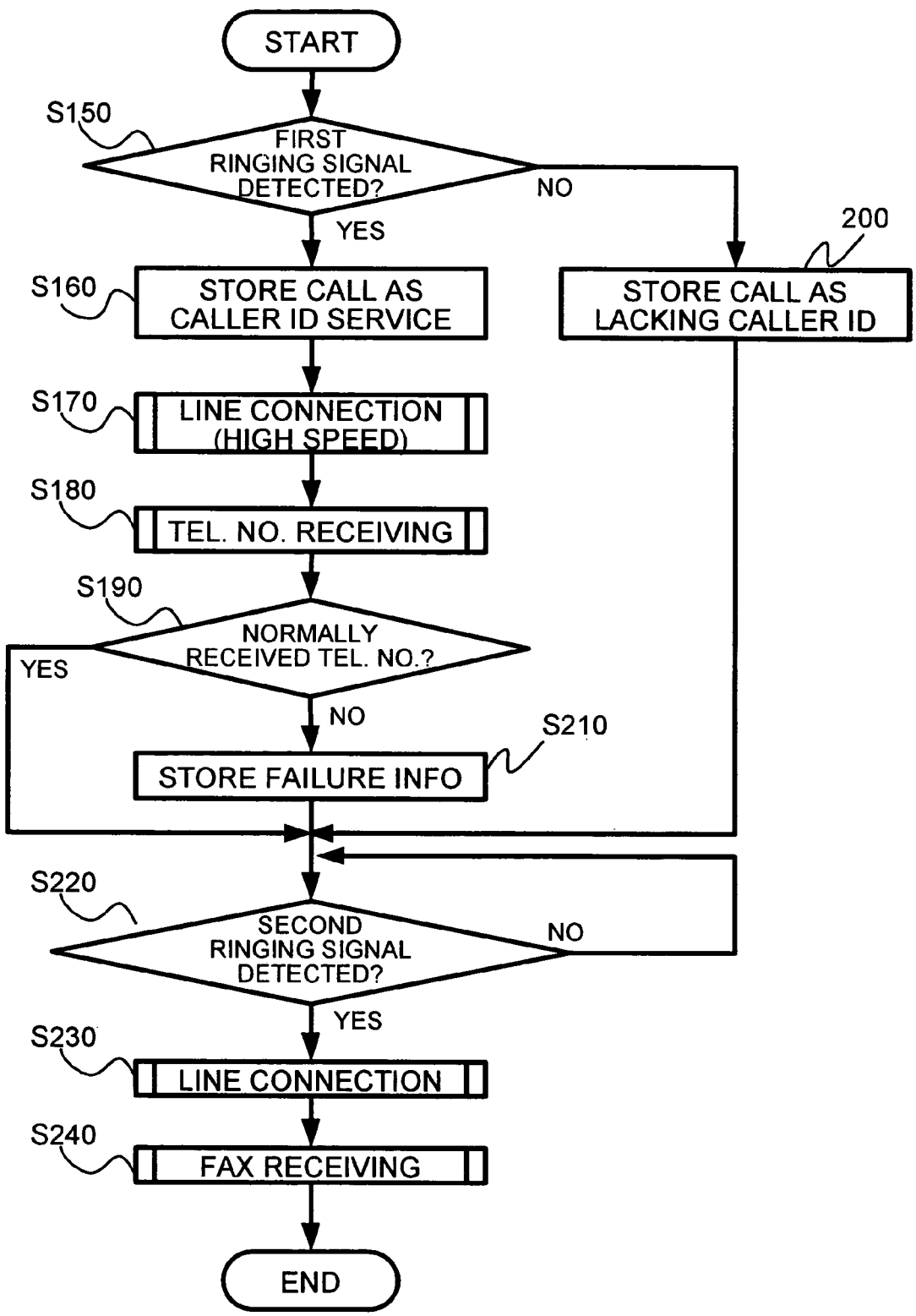
FIG. 8 is a flowchart of a call/facsimile receiving operation in the automatic verification process according to illustrative embodiments of the invention.

FIG. 8 is a flowchart illustrating a process of how the multifunction device 1 receives an incoming call or facsimile issued or transmitted from the service center 70 to the multifunction device 1, in connection with the process shown in FIG. 7 in the automatic verification. By executing the process, the multifunction device 1 verifies the first line connection condition stored in the EEPROM 109.

At the arrival of the incoming call from the service center 70, the multifunction device 1 determines whether the line interface 113 has detected a first ringing signal (S150). When the line interface 113 has detected the first ringing signal (S150: Yes), the multifunction device 1 determines that the call was issued while a telephone number of the call was transmitted (S160). If the first ringing signal was not detected (S150: No), then the system stores the call as lacking caller ID.

To receive the telephone number transmitted after the reception of the first ringing signal, the line interface 113 performs line connection in accordance with the first line connection condition stored in the EEPROM 109 (S170), and receives the telephone number (S180).

The multifunction device 1 determines whether the line interface 113 has received the telephone number of the service center 70 at S180 in response to the line connection at S170 (S190). When the line interface 113 received the telephone number (S190: Yes), the multifunction device 1 determines whether the line interface 113 has received a second ringing signal (S220). If the line interface 113 has not detected the second ringing signal (S220: No), the multifunction device 1 waits until the line interface 113 detects the second ringing signal.

When the line interface 113 fails to receive the telephone number of the service center 70 (S190: No), the multifunction device 1 stores failure information including the cause in the RAM 109 (S210) and prints it at the printer unit 20. The failure information stored in the RAM 109 may be put through a specified process and then faxed to the service center 70 again. According to such a configuration, the failure information may be analyzed, and appropriate measures may be considered at the service center 70, and reported to the user of the multifunction device 1.

When the line interface 113 has detected the second ringing signal (S220: Yes), it executes the line connection as described in the first embodiment (e.g. FIG. 4). When the line connection is performed (S230), the line interface 113 executes a facsimile receiving process (S240).

If the line interface 113 fails to receive the telephone number because of the first line connection condition stored in the EEPROM 109 as the default setting (S190: No), a line connection condition adjusted at S230 may be stored in the EEPROM 109 as the first line connection condition.

What is claimed is:

1. A communications apparatus comprising:
   a communications device including a data access arrangement (DAA), the communications device connected to a telephone line, the communications device configured to receive a ringing signal and to control line connection in response to reception of the ringing signal; and
   a storage device configured to store a line connection condition when the communications device is connected with an exchange via the telephone line in a communicable state as a first condition,
   wherein, when the communications device receives the ringing signal, the communications device performs the line connection using the first condition previously stored in the storage device.

2. The communications apparatus according to claim 1, wherein the communications apparatus is configured to receive caller ID information specifying a caller,
   the caller ID information is transmitted from the exchange through the telephone line,
   the communications device is configured to receive the caller ID information, and
   the ringing signal is a first ringing signal transmitted prior to the caller ID information.

3. The communications apparatus according to claim 2, wherein the ringing signal is one of said first ringing signal and a second ringing signal, said second ringing signal transmitted after the caller ID information is transmitted, and the communications device controls line connection in response to reception of the first ringing signal and the second ringing signal.

4. The communications apparatus according to claim 1, further comprising
   a voltage detection device configured to detect a telephone line voltage after the line connection is performed by the communications device;
   an adjustment device configured to adjust a line connection condition stored in the storage device so that the telephone line voltage value detected by the voltage detection device falls within a specified range with respect to a relationship between a predetermined line voltage value and telephone line current value;
   a signal determination device configured to determine that a line connection is based on the first ringing signal or the second ringing signal,
   wherein, when the signal determination device determines that the line connection is based on the first ringing signal, the communications device performs the line connection using the first condition previously stored in the storage device, and
   when the signal determination device determines the line connection is based on the second ringing signal, the communications device performs the line connection using a second line connection condition adjusted by the adjustment device at a time of determination.

5. The communications apparatus according to claim 3, further comprising a line connection detection device configured to detect that the telephone line is newly connected to the communications device, and wherein when a line connection is made based on a first call after the line connection detection device detects that the telephone line is newly connected to the communications device, the adjustment device adjusts a line connection condition so that the telephone line voltage value detected by the voltage detection device falls within the specified range with respect to the relationship between the predetermined line voltage value and telephone line current value, and the storage device stores the line connection condition based on the first call as the first condition stored by the storage device.

6. The communications apparatus according to claim 3, wherein the adjustment device includes a storage determination device configured to determine whether the first condition is stored in the storage device, and when the storage determination device determines that the first condition is stored in the storage device, the adjustment device starts an adjustment of the different line connection condition from the first condition.

7. A communications system including a communications apparatus configured to transmit and receive a telephone number specifying a caller to be transmitted from an exchange through a telephone line, and an answering apparatus connected to the communications apparatus via the telephone line, the answering apparatus configured to transmit and receive the telephone number specifying the caller, the communications system configured to check whether the communications apparatus receives a telephone number of the answering apparatus, the communications system comprising:

the communications apparatus comprising:
a communications device including a data access arrangement (DAA), the communications device configured to be connected to the telephone line and to receive the telephone number specifying the caller, a first ringing signal transmitted prior to the telephone number specifying the caller, and a second ringing signal transmitted after the telephone number specifying the caller is transmitted, the communications device configured to control line connection in response to reception of the first ringing signal and the second ringing signal;
a voltage detection device configured to detect a telephone line voltage after the line connection is performed by the communications device;
an adjustment device configured to adjust a line connection condition so that the telephone line voltage value detected by the voltage detection device falls within a specified range with respect to a relationship between a predetermined line voltage value and telephone line current value;
a storage device configured to store a line connection condition adjusted by the adjustment device when the communications device is connected with the exchange via the telephone line in a communicable state as a first condition, and the storage device configured to store the telephone number of the answering apparatus;
a communications device-side calling device configured to issue a call to the answering device using the telephone number of the answering apparatus stored in the storage device in addition to a telephone number of the communications apparatus;
an instruction device configured to instruct the calling device to issue a call; and
a verification device configured to determine whether the communications apparatus receives the telephone number of the answering apparatus in response to line connection using the first condition previously stored in the storage device, the line connection performed by the communications device in response to that the signal determination device determines that the line connection is based on the first signal at an arrival of a call from the answering apparatus, the call issued conditionally on the call instructed by the instruction device, and the answering apparatus comprising:
a receiving device configured to receive a call issued from the communications apparatus along with the telephone number of the communications apparatus; and
an answering device-side calling device configured to issue a call to the communications apparatus that has issued a call using the telephone number of the communications apparatus received by the receiving device, the call issued to the communications apparatus along with the telephone number of the answering apparatus.

8. A computer readable medium having a program stored thereon, said program read by a computer configured to control a communications apparatus capable of receiving caller ID information specifying a caller to be transmitted from an exchange through a telephone line, the program controlling the computer, said computer comprising:
a communications device including a data access arrangement (DAA), the communication devices configured to be connected to the telephone line and to receive the caller ID information, a first ringing signal transmitted prior to the caller ID information, and a second ringing signal transmitted after the caller ID information is transmitted, the communications device configured to control line connection in response to reception of the first ringing signal and the second ringing signal;
a voltage detection device configured to detect a telephone line voltage after the line connection is performed by the communications device;
an adjustment device configured to adjust a line connection condition so that the telephone line voltage value detected by the voltage detection device falls within a specified range with respect to a relationship between a predetermined line voltage value and telephone line current value;
a storage device configured to store a line connection condition adjusted by the adjustment device when the communications device is connected with the exchange via the telephone line in a communicable state as a first condition; and
a signal determination device configured to determine that a line connection is based on the first ringing signal or the second ringing signal,
wherein, when the signal determination device determines that the line connection is based on the first ringing signal, the communications device performs the line connection using the first condition previously stored in the storage device, and
when the signal determination device determines the line connection is based on the second ringing signal, the communications device performs the line connection using a second line connection condition adjusted by the adjustment device at a time of determination.

9. A computer-readable medium having a program stored thereon, said program read by a computer configured to control a communications apparatus capable of receiving caller ID information specifying a caller to be transmitted from an exchange through a network, the computer including a communication device connected to a telephone line and receiving a first ringing signal transmitted prior to the caller ID information and a second ringing signal after caller ID information is transmitted, the communications device configured to control line connection in response to reception of the first ringing signal and the second ringing signal, a voltage detection device configured to detect a telephone line voltage after the line connection is performed by the communications device, an adjustment device configured to adjust a line connection condition so that the telephone line voltage value detected by the voltage detection device falls within a specified range with respect to a relationship between a predetermined line voltage value and telephone line current value, a storage device configured to store a line connection condition adjusted by the adjustment device when the communications device is connected with the exchange via the telephone line in a communicable state as a first condition, and a signal determination device configured to determine that a line connection is based on the first ringing signal or the second ringing signal, said program comprising the steps of:

when the signal determination device determines that the line connection is based on the first ringing signal, performing the line connection using the first condition previously stored in the storage device; and when the signal determination device determines the line connection is based on the second ringing signal, performing the line connection using a second line connection condition adjusted by the adjustment device at a time of determination.

* * * * *